United States Patent [19]

Stettner et al.

[11] Patent Number: 4,958,773

[45] Date of Patent: Sep. 25, 1990

[54] FUEL INJECTION

[75] Inventors: Ernest R. Stettner, Spencerport; Donald D. Stoltman, Henrietta; Robert S. Taylor, Fairport, all of N.Y.

[73] Assignee: General Motors Corporation, Detroit, Mich.

[21] Appl. No.: 369,505

[22] Filed: Jun. 21, 1980

[51] Int. Cl.[5] ............ F16K 31/02

[52] U.S. Cl. ............ 239/584; 239/585; 137/625.28; 251/129.16

[58] Field of Search ............ 239/562, 566, 577, 584, 239/585, 533.11; 137/625.28; 251/129.16

[56] References Cited

U.S. PATENT DOCUMENTS

| | | | |
|---|---|---|---|
| 2,374,895 | 5/1945 | Ray | 251/129.16 |
| 2,755,851 | 7/1956 | Dow et al. | 239/566 X |
| 2,881,980 | 4/1959 | Beck et al. | 251/129.16 X |
| 4,354,640 | 10/1982 | Hans | 239/585 |
| 4,515,129 | 5/1985 | Stettner . | |
| 4,570,598 | 2/1986 | Samson . | |
| 4,572,436 | 2/1986 | Stettner et al. | 239/585 |
| 4,708,117 | 11/1987 | Mesenich . | |
| 4,768,720 | 9/1988 | Cocca . | |

FOREIGN PATENT DOCUMENTS 249313 12/1987 European Pat. Off. .

*Primary Examiner*—Andres Kashnikow
*Assistant Examiner*—William Grant
*Attorney, Agent, or Firm*—C. K. Veenstra

[57] ABSTRACT

An injector has a single tapered valve controlling fuel flow to a plurality of outlet passages. The entrance to each outlet passage has an orifice surrounded by a raised valve seat. Each valve seat is separated from the other valve seats by a recessed space. The valve pivots as it is displaced from the valve seat to allow fuel flow through the outlet passages, and is constrained against other motion within the injector. The valve seats are clustered beneath the free end of the valve. The orifices are sized to compensate for the unequal lift of the tapered valve from the valve seats.

1 Claim, 2 Drawing Sheets

FUEL INJECTION

TECHNICAL FIELD

This invention relates to a fuel injection system for a multi-cylinder internal combustion engine in which a plurality of injection nozzles discharge fuel adjacent the engine inlet ports and a single injector meters the fuel to all of the injection nozzles.

DETAILED DESCRIPTION

Figure 1:
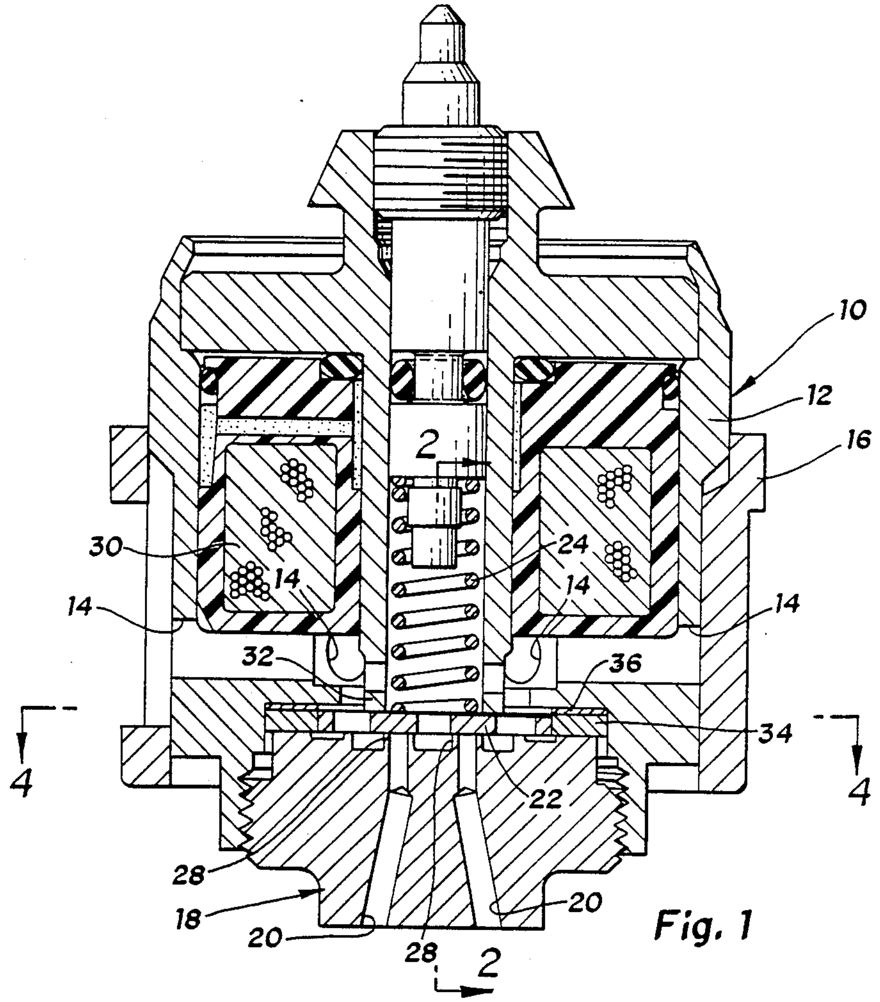
FIG. 1 is a sectional view of a single injector that meters fuel to six injection nozzles in accordance with this invention.

Referring to the drawings, an injector 10 has a body 12 that receives fuel through a plurality of radial inlet passages 14 surrounded by a filter 16. A distributor 18 threaded into the lower end of body 12 delivers fuel through six outlet passages 20, each of which directs fuel to an associated injection nozzle.

Figure 2:
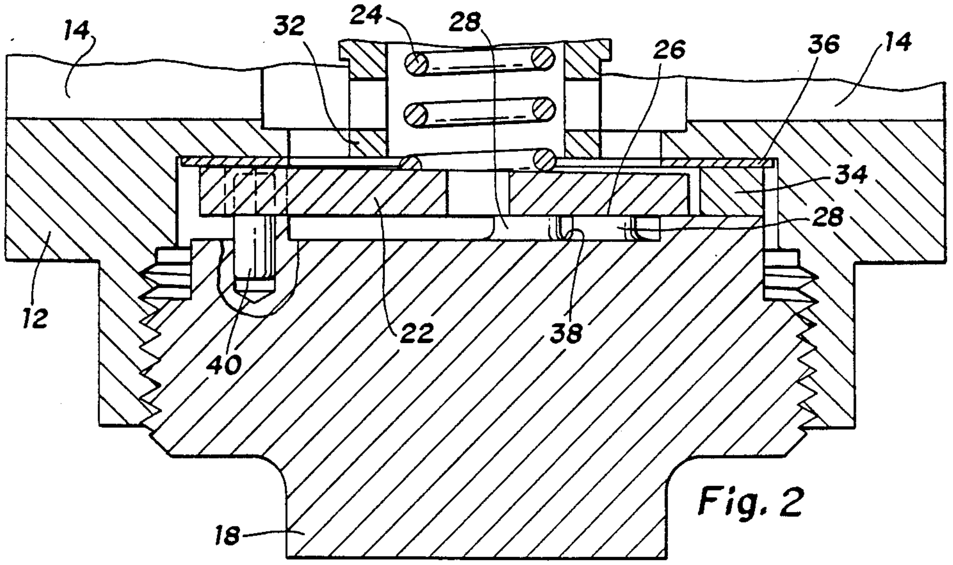
FIG. 2 is an enlarged sectional view of the lower portion of the FIG. 1 injector, taken along the line 2—2 of FIG. 1, showing the injector valve engaging its seat.

A valve 22 controls the delivery of fuel through passages 20. As shown in FIG. 2, valve 22 is biased by a spring 24 to engage a planar surface 26 formed by raised valve seats or lands 28, each surrounding one of the passages 20, and thereby interrupt fuel delivery through passages 20.

Figure 3:
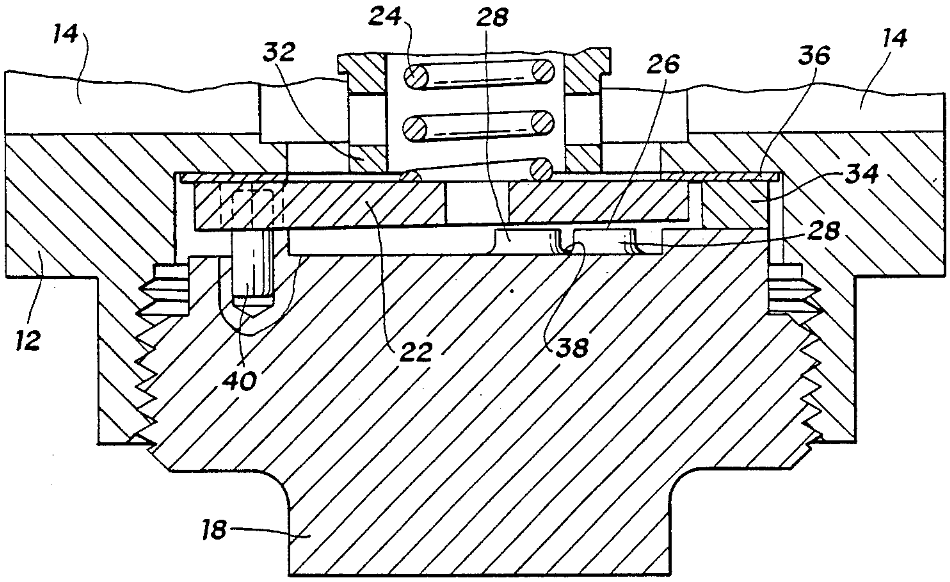
FIG. 3 is a view similar to FIG. 2, showing the injector valve lifted from its seat.
Figure 4:
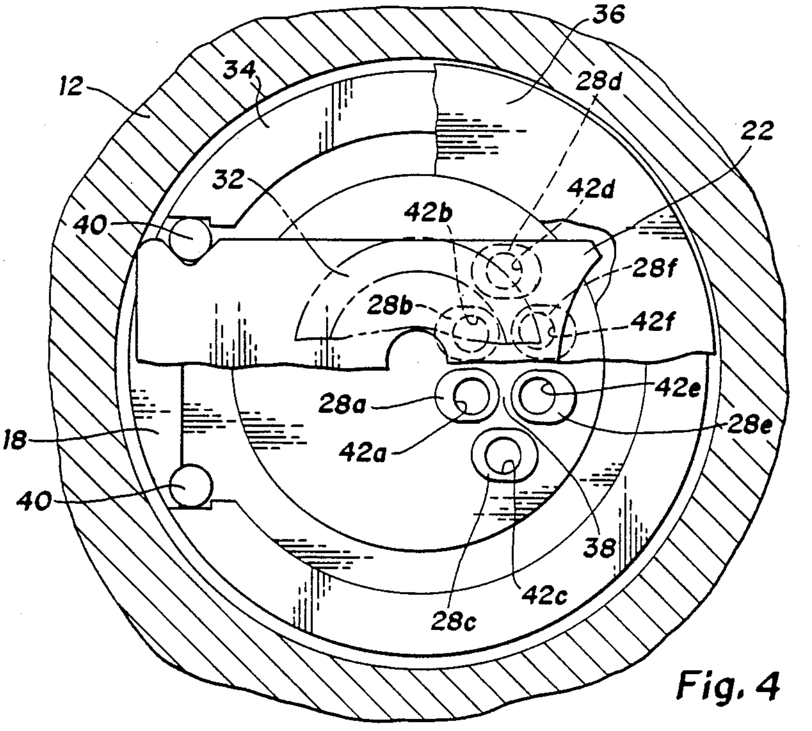
FIG. 4 is an enlarged sectional view of the FIG. 1 injector, taken along line 4—4 of FIG. 1 and with various portions broken away, showing the relationship of the injector valve and the orifices through which the injector meters the fuel to the injection nozzles.

Injector 10 includes a solenoid having a coil 30, a center pole 32 surrounding spring 24, a ring 34 surrounding valve 22 and sandwiched with a shim 36 between body 12 and distributor !8, and an armature formed by valve 22 Valve 22 is tapered from its thickest portion on the left as viewed in FIGS. 2-3 to its thinnest portion on the right When coil 30 is energized as shown in FIG. 3 to actuate valve 22, the thickest portion of valve 22 engages shim 36 and causes the valve to pivot about its left edge, thereby lifting from lands 28 to allow fuel delivery through passages 20.

Each land 28 is separated from the other lands by the recessed space 38 between the lands. The recessed space 38 assures that each land 28 is isolated from the other lands to minimize the effect or interaction of fuel delivery through any one passage 30 on fuel delivery through the other passages.

Because valve 22 pivots as it lifts from lands 28, the clearance between valve 22 and lands **28*a* and 28*b* is less than the clearance between valve 22 and lands 28*c* and 28*d* which in turn is less than the clearance between valve 22 and lands 28*e* and 28*f*. Unless otherwise compensated, the differences in clearance would create undesirable inequalities in fuel delivery through passages 20**.

To minimize the differences in clearance, passages 20 are clustered beneath the right or free end of armature valve 22, and pins 40 hold valve 22 in alignment with passages 20. Pins 40 are imbedded in distributor 18 and constrain the movement of valve 22 to the pivotal motion described above, preventing valve 22 from rotating on distributor 18. To compensate for the remaining differences in clearance, the orifices 42 formed at the entrance to each passage 20 are sized to assure equal fuel delivery through passages 20. Orifices **42*a* and 42*b* associated with lands 28*a* and 28*b* are larger than orifices 42*c* and 42*d* associated with lands 28*c* and 28*d*, and orifices 42*c* and 42*d* in turn are larger than orifices 42*e* and 42*f* associated with lands 28*e* and 28*f*. In one embodiment, the clearance between valve 22 and lands 28*a* and 28*b* is about 0.0056 and the diameter of orifices 42*a* and 42*b* is about 0.041, the clearance between valve 22 and lands 28*c* and 28*d* is about 0.0060 and the diameter of orifices 42*c* and 42*d* is about 0.0395, and the clearance between valve 22 and lands 28*e* and 28*f* is about 0.0065 and the diameter of orifices 42*e* and 42*f*** is about 0.038. (Dimensional units are not provided; only the proportions are significant.)

Injector 10 also employs the invention set forth in patent application Ser. No. 07/369,599 filed concurrently.

What is claimed:

1. An injector comprising a distributor having a plurality of outlet passages and an orifice at the entrance of each of said passages and a valve seat surrounding each of said orifices, a tapered valve biased to engage said valve seats to interrupt fuel delivery through said outlet passages, a valve actuator adapted to pivotally displace said valve from said valve seats to allow fuel delivery through said passages, said valve pivoting about one end thereof as it is displaced whereby the lift of said valve from the valve seat furthest from said end of said valve is greater than the lift of said valve from the valve seat closest to said end of said valve, and wherein said orifices are sized to compensate for the difference in lift of the valve from the associated valve seats, the orifice associated with the valve seat closest to said end of said valve being larger than the orifice associated with the valve seat furthest from said end of said valve.

* * * * *